United States Patent Office 3,191,662
Patented June 29, 1965

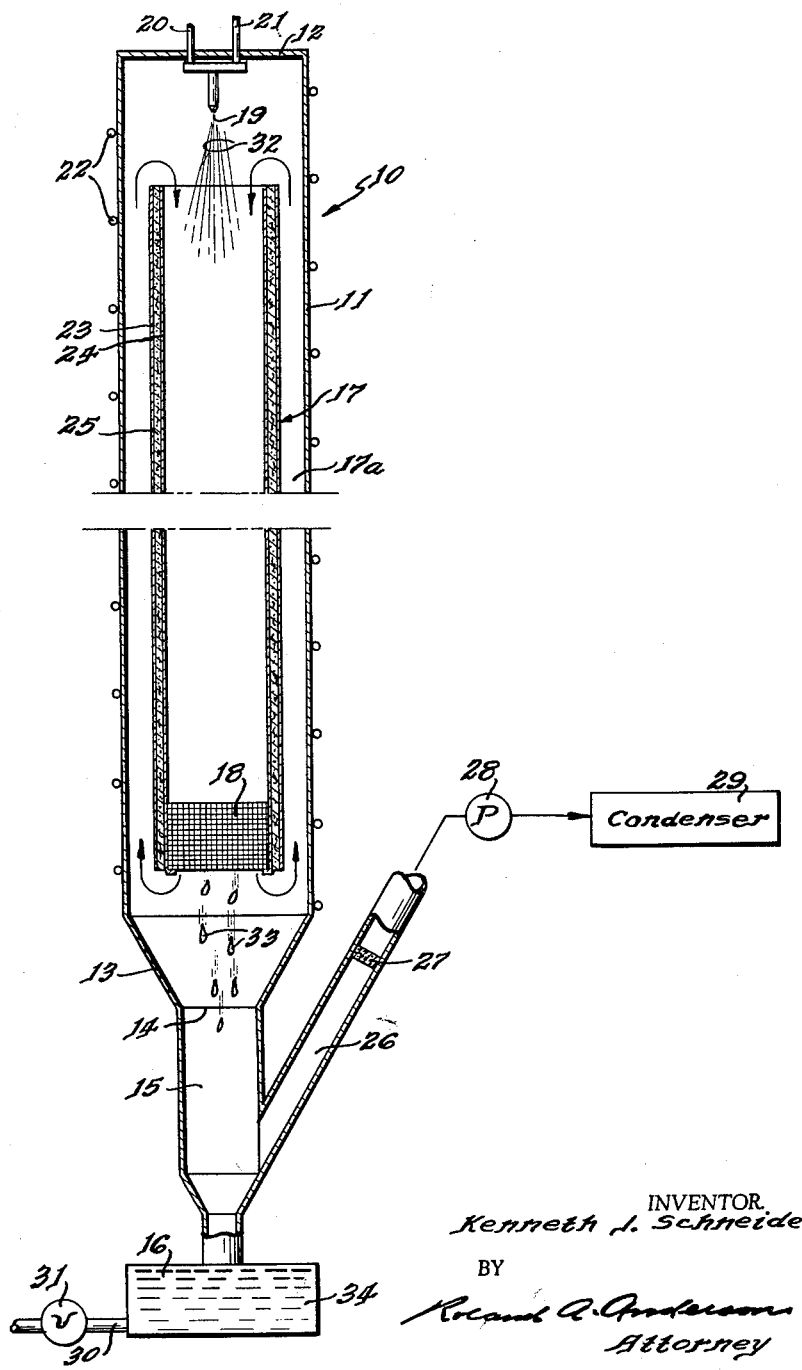

3,191,662
CONTINUOUS SOLUTION CONCENTRATOR
Kenneth J. Schneider, Richland, Wash., assignor to the United States of America as represented by the United States Atomic Energy Commission
Filed July 18, 1962, Ser. No. 210,865
2 Claims. (Cl. 159—3)

This invention relates to a novel solution concentrator, more particularly to a concentrator of aqueous radioactive waste solutions from nuclear reactor fuel reprocessing.

The removal of solvent from solutions in order to make them more concentrated, or into slurries, is desirable in many different kinds of processes. A common failing of the continuous solution concentrators now in use is their tendency to become coated with a deposit of solids, or scales, which require frequent shutdowns in order to remove them.

In the concentration of solutions from nuclear reactor fuel reprocessing such deposits, or scales, are particularly undesirable due to the radioactive fission products distributed through them. Because of this it has been common up until the present to forego the use of continuous concentrators altogether for highly concentrated salt solutions, and to resort to batch methods of simply evaporating the waste solutions to dryness in individual vessels or pots. The drawbacks to this expedient are slowness and low capacity, and these are all the more serious because the evaporation has to be carried out behind radiation shielding, which is very expensive.

Attempts have been made to devise continuous spray concentrators for the purpose, but they have all been rather complicated. External heaters and blowers have been found to be necessary, with an external circulating circuit for carrying the vapors from and reintroducing them into the concentrator. Such arrangements as these are obviously lacking in compactness. If a compact continuous concentrator could be devised which would not require frequent cleanouts, savings could therefore be made both in handling time and in the investment for shielding purposes.

It is, accordingly, the general object of the invention to provide a continuous solution concentrator which will be less subject to the deposition of solids from highly concentrated solutions than those now in use.

It is a more particular object to provide a continuous solution concentrator which will be suitable for the concentration of aqueous solutions resulting from nuclear reactor fuel reprocessing.

Other objects will appear as the description proceeds.

The foregoing objects are attained by my concentrator which, while keeping the walls cool with which the solution comes in contact, concentrates the solution by heating the atmosphere. This avoids deposition of solids on the walls, and yet I have found it possible to devise a compact apparatus which will meet this requirement of cooling of the walls and yet supply sufficient heat to evaporate the solution to the desired concentration without the need for an external heater, an external circuit or a blower of any kind.

Reference is now made to the drawing, the only figure of which shows a sectional view of a preferred embodiment of the invention which is partly broken away. The numeral 10 designates the continuous solution concentrator generally, which is of elongated, cylindrical shape. It has a first outer enclosure 11 with a top 12 and a tapered bottom 13 having an opening 14 leading into a conduit 15 which, in turn, leads into a collecting reservoir 16.

Within the enclosure 11 is a second enclosure 17, of similar shape and lesser dimensions, coaxially disposed within the larger enclosure 11 and radially spaced therefrom so as to form an outer channel 17a between them. Enclosure 17 is open at the top and at its bottom is a wire mesh de-entrainer 18.

Adjacent the top 12 of enclosure 11 is spray nozzle 19, disposed to direct a spray into enclosure 17, preferably with its tip near the end of enclosure 17 in order to minimize turbulence when the nozzle is in operation. Atomizing gas line 20 and feed solution line 21 lead into spray nozzle 19. Enclosure 11 is closely and externally surrounded by heating means 22, for example a coil resistance heater. Enclosure 11 is a sheet of solid metal, in this case, stainless steel, and hence has relatively high thermal conductivity.

Coming now to the details of the inner enclosure 17, it consists of two metal sheets 23 and 24, between which is insulating material 25, in this case, compacted alumina. Hence, enclosure 17 has relatively low thermal conductivity, and for practical purposes may be considered to be heat insulative.

Leading upward and away from conduit 15 is vapor drawoff line 26, which leads through filter 27 to pump 28 and vapor condenser 29. Leading from collecting reservoir 16 is product line 30, flow in which is regulated by control valve 31.

In operation the heater 22 is turned on to raise the temperature of the outer wall of the enclosure 11, and the solution is sprayed from the nozzle 19, preferably with an easily condensable atomizing gas such as steam. Since the tube, or inner enclosure 17, is thermally insulating the volume of gas within it will be cooler than the gas in the outer channel 17a between it and the outer enclosure 11; this difference in temperature will set up a gas convection pattern upward within the outer channel 17a and downward within the inner enclosure 17, as indicated by the curved arrows.

The convection pattern will be reinforced by the additional velocity imparted to the gas by the force of the spray from the nozzle 19, which is in the shape of a cone directed into the enclosure 17, as indicated by the dotted lines at 32. The spray will reinforce the gas convection pattern for a further reason; it will tend to cool the volume of gas within the enclosure 17 and thus help to maintain the different in temperature between the gases in this region and those in the outer channel 17a. Several things contribute to this cooling effect. The spray will be cooler than the gases within the concentrator 10 to begin with. The atomizing gas, on expanding from the confinement of the nozzle, will cool by reason of the Joule-Thomson refrigeration effect. Thirdly, the solvent of the solution being sprayed, such as the water of a nuclear waste solution, will evaporate and thus cause evaporative cooling.

As a result of the cooperation of these various influences, a strong upward movement of gases will take place along the heated wall 11 and downward within the volume enclosed by tube 17, and a continuous transfer of heat from the former to the latter. This transfer, it should be noted, will take place to evaporate the material of the spray from the nozzle 19, and yet the spray will not impinge upon any heated wall where it might deposit solids.

Because of the heat transfer just described the spray will lose a large portion of its solvent such as water through evaporation as it travels down the inside of the tube, or enclosure 17. The droplets of the spray will therefore be smaller and more concentrated, and as they impinge upon the wires of the wire-mesh de-entrainer 18 they will substantially all cling to it and the gases and vapors will pass through the mesh and recirculate. The droplets along the wires of the mesh will coalesce into drops of large size which will then drip through the mesh as at 33 and fall into the collecting reservoir 16 below to form the product concentrate, or slurry 34.

To avoid accumulation of gases, vapor drawoff line 26 is provided, together with the pump 28 and vapor condenser 29. The pump is operated continuously, and the condensable atomizing gas, such as steam and the vaporized solvent are condensed in the condenser. Of course, it would be possible to discharge the gas and vaporized solvent into the air instead of condensing it, but this would create a safety hazard when nuclear reactor solutions are being concentrated because of the radioactivity. Hence, the condenser is a necessary feature in the latter application, and it is preferable in many, if not all others.

It is to be understood that my solution concentrator could use de-entrainers of other types than the wire mesh type. A de-entrainer of the baffle type, which is known in the art, could be used. If the size of the droplets produced by the nozzle are not smaller than about 50 microns a de-entrainer can be dispensed with entirely and the 180° turn taken by the recycle gases alone would create a sufficient de-entraining effect. However, it is usually necessary to use sprays that give finer droplets than this, so a de-entrainer is ordinarily necessary.

Many different types of nozzles may be used, both of the one fluid and two fluid types.

EXAMPLE

A pilot size solution concentrator along the lines of that shown in the drawing was fabricated from an outer enclosure of stainless steel tube 10 feet long, with an inner diameter of 8 inches. A four foot length of heat-insulating tube 6 inches in inner diameter was placed coaxially within it and anchored 12 inches below the top 12. The latter tube was made of two coaxial sleeves of 20-gauge stainless steel, between which was a quarter inch layer of compacted 20-mesh aluminum oxide sand. The tube had a thermal conductivity value of 5 B.t.u./hr.$\times$ft.$^2\times$° F.

A six inch thick pad of Yorkmesh wire mesh, six inches in diameter, was placed inside the inside tube at the bottom as the de-entrainer. The mesh was composed of stainless steel wires 0.011 inch in diameter.

The nozzle was of the pneumatic atomizing type No. 12a, manufactured by Spraying Systems Company, and was placed in the center of the top 12 with its tip about six inches above the end of enclosure 17. It was adjusted to spray droplets from 1 to 200 microns in diameter, with a mean diameter of about 50 microns. The atomizing gas was steam which was fed at the rate of 11.3 pounds per hour at 61 p.s.i.g.

The feed solution was fed at the rate of one gallon per hour; its composition was as follows:

Table I.—Feed solution composition

| Ion: | Concentration molarity |
|---|---|
| $H^+$ | 1.6 |
| $Na^+$ | 2.8 |
| $Fe^{+3}$ | 0.29 |
| $Al^{+3}$ | 0.14 |
| $Pb^{+2}$ | 0.003 |
| $Ni^{+2}$ | 0.014 |
| $Cr^{+3}$ | 0.029 |
| $NO_3^-$ | 2.6 |
| $SO_4^{-2}$ | 1.6 |

The wall 11 was heated within the range of 180° C. to 260° C. Below this range it was found that relatively little concentration of the feed solution occurred, and above it partial calcination took place.

The pressure drop within the concentrator was about 0.005 p.s.i.

The concentrate in the collecting reservoir was removed and analyzed from time to time and found to have concentrations about double those of the feed solution.

After a run of 1.75 hours the concentrator was examined for solids deposition, or fouling, and this was found to be very slight and confined to the top few inches of the inside of the tube 17.

It will be understood this invention is not to be limited to the details given herein but that it may be modified within the scope of the appended claims.

What is claimed is:

1. A solution concentrator comprising an elongated vertical stationary first enclosure having an impermeable thermally conductive long wall, a second elongated stationary enclosure open at both ends and of lesser dimensions than the first enclosure, coaxially disposed therein and radially spaced therefrom, thereby defining an open coaxial vertical space between the enclosures, the said space being in communication with the space within the said second enclosure at both ends thereof, the said second enclosure having a long impermeable wall of low thermal conductivity, a spray nozzle adjacent the top of the first enclosure disposed to direct a spray into the second enclosure, an atomizing gas line and a solution line both leading from the outside to the spray nozzle, the first enclosure having an opening in its bottom, and means for drawing vapor out of the concentrator at a location below the lower end of the second enclosure.

2. A compact solution concentrator comprising an elongated, vertical, metal first enclosure in the shape of a right cylinder, heating means closely surrounding the curved wall of the cylinder, a second enclosure of similar shape open at the top and bottom ends, of lesser dimensions than the first enclosure, coaxially disposed and radially spaced therefrom, the said second enclosure having a curved wall containing heat insulating material throughout its area, a spray nozzle adjacent the top of the first enclosure terminating in a tip about six inches above the second enclosure and disposed to direct a spray into the second enclosure, an atomizing gas line and a solution line both leading from the outside through the top of the first enclosure to the spray nozzle, a wire mesh de-entrainer in the bottom of the second enclosure, the said first enclosure having an opening in its bottom, a collecting reservoir beneath the said opening, a conduit leading from said opening to the reservoir, a filter, a condenser, a pump, a drawoff line leading upwardly and away from said conduit to said filter, pump and condenser, a control valve and an outlet line leading from said reservoir through the said control valve.

References Cited by the Examiner

UNITED STATES PATENTS

| 1,133,051 | 3/15 | Merrell | 159—4 X |
| 1,163,339 | 12/15 | Hauss. | |
| 1,512,776 | 10/24 | Lough. | |
| 1,866,769 | 7/32 | Harris. | |
| 2,037,809 | 4/36 | McMullen | 34—36 |
| 2,561,395 | 7/51 | Marshall. | |
| 2,873,799 | 2/59 | Earley et al. | |
| 3,101,258 | 8/63 | Johnson | 159—3 X |

FOREIGN PATENTS

| 312,424 | 5/19 | Germany. |
| 377,747 | 6/23 | Germany. |
| 4,824 | 1886 | Great Britain. |
| 42,328 | 5/16 | Sweden. |

NORMAN YUDKOFF, *Primary Examiner.*